United States Patent
Tonzetic et al.

(10) Patent No.: US 9,450,909 B2
(45) Date of Patent: Sep. 20, 2016

(54) METHOD OF AND A PROCESSING DEVICE HANDLING A PROTOCOL ADDRESS IN A NETWORK

(71) Applicant: Telefonaktiebolaget L M Ericsson (publ), Stockholm (SE)

(72) Inventors: Tomislav Tonzetic, Zagreb (HR); Ivica Matausic, Samobor (HR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 312 days.

(21) Appl. No.: 14/131,804

(22) PCT Filed: Jan. 9, 2013

(86) PCT No.: PCT/EP2013/050256
§ 371 (c)(1),
(2) Date: Jan. 9, 2014

(87) PCT Pub. No.: WO2014/108175
PCT Pub. Date: Jul. 17, 2014

(65) Prior Publication Data
US 2015/0372968 A1    Dec. 24, 2015

(51) Int. Cl.
*H04L 29/12* (2006.01)

(52) U.S. Cl.
CPC ......... *H04L 61/2007* (2013.01); *H04L 61/103* (2013.01); *H04L 61/6004* (2013.01); *H04L 61/6009* (2013.01); *H04L 61/6022* (2013.01); *H04L 61/6068* (2013.01)

(58) Field of Classification Search
CPC ............. H04L 61/6004; H04L 61/103; H04L 61/2092; H04L 61/20; H04L 61/2007
See application file for complete search history.

(56) References Cited

U.S. PATENT DOCUMENTS 8,185,639 B2 *  5/2012  Krishnan ............ H04L 29/1232
                                                        709/206
2003/0120766 A1 *  6/2003  Ishiyama ............ H04L 12/2856
                                                        709/223
(Continued)

FOREIGN PATENT DOCUMENTS

JP    2012050030 A    3/2012

OTHER PUBLICATIONS

Smoot, C-M, et al., "Using ARP to Implement Transparent Subnet Gateways", Network Working Group Request for Comments: 1027, Oct. 1, 1987, pp. 1-8, [retrieved on Oct. 30, 2012], retrieved from internet: http://www.ietf.org/rfc/rfc1027.txt.
(Continued)

*Primary Examiner* — Jerry Dennison
(74) *Attorney, Agent, or Firm* — Coats & Bennett, PLLC

(57) ABSTRACT

The invention relates to a method of handling a protocol address (IP_x) in a network (10). The network comprises a number of K servers (12). A server is uniquely identified in the network by a server identifier (Sid_x). A server houses a maximum number of L units (14). A unit comprises one hardware address (MACx) to connect to the network and a unit identifier (Eid_x) which uniquely identifies the unit in the server. A unit hosts a maximum number of M hosts (16). Each host on a unit comprises a local host identifier (Hid_x) uniquely identifying the host on the unit. A unit (14) generates a protocol address (IP_x) for a host on the unit based on the local host identifier (Hid_x) of the host, the unit identifier (Eid_x) of the unit and the server identifier (Sid_x) associated with the unit and assigns the protocol address to the host (16).

19 Claims, 3 Drawing Sheets

(56) References Cited

U.S. PATENT DOCUMENTS

| | | | |
|---|---|---|---|
| 2004/0083293 A1 | 4/2004 | Chen et al. | |
| 2005/0174998 A1* | 8/2005 | Vesterinen | H04L 29/12216 370/354 |
| 2005/0262218 A1* | 11/2005 | Cox | H04L 61/2015 709/217 |
| 2006/0176847 A1* | 8/2006 | Chen | G08G 1/161 370/328 |
| 2007/0156877 A1* | 7/2007 | Krishnan | H04L 29/1232 709/223 |
| 2008/0024819 A1* | 1/2008 | Tanji | H04L 29/12216 358/1.15 |
| 2009/0204691 A1* | 8/2009 | Xia | H04L 29/1232 709/220 |
| 2011/0282979 A1* | 11/2011 | Bower, III | H04L 29/12283 709/222 |
| 2012/0063458 A1* | 3/2012 | Klink | H04L 29/12367 370/392 |
| 2013/0145008 A1* | 6/2013 | Kannan | H04L 45/586 709/223 |
| 2013/0173685 A1* | 7/2013 | Huang | H04L 61/2015 709/201 |
| 2013/0227566 A1* | 8/2013 | Higuchi | G06F 9/45533 718/1 |

OTHER PUBLICATIONS

Cheshire, S., et al., "Dynamic Configuration of IPv4 Link-Local Addresses", Network Working Group Request for Comments: 3927, Category: Standards Tracks, May 1, 2005, pp. 1-33, [retrieved on Oct. 30, 2013], retrieved from internet: http://www.ietf.org/rfc/rfc3927.txt.

* cited by examiner

METHOD OF AND A PROCESSING DEVICE HANDLING A PROTOCOL ADDRESS IN A NETWORK

TECHNICAL FIELD

The invention relates to the field of network technologies, and in particular, to a method of and a device handling a protocol address in a network.

BACKGROUND

The Address Resolution Protocol (ARP) is a very important part of Internet Protocol (IP) networking. ARP is a OSI Layer 2 (Data-Link) protocol used to map Media Access Control (MAC) addresses to IP addresses. All hosts on a local area network or private network are located by their IP address. ARP is the protocol used to associate the IP address to a MAC address.

Before a host can communicate with any other host in the network, the host must have the MAC address for that other host. In TCP/IP networks, the MAC address of an interface can be queried knowing the IP address using the Address Resolution Protocol (ARP) for Internet Protocol Version 4 (IPv4) or the Neighbor Discovery Protocol (NDP) for IPv6. Therefore, the hosts sends out (broadcasts) an ARP packet. The ARP packet contains a simple question: What is the MAC address corresponding to IP address 10.5.5.1? The host that has been configured to use the IP address responds with an ARP packet containing its MAC address. In this way, ARP is used to translate IPv4-addresses (OSI layer 3) into MAC addresses (OSI layer 2).

The ARP software running on a device with a MAC address maintains a table of translations between IP addresses and MAC addresses. This table is normally built dynamically. When ARP receives a request to translate an IP address to a MAC address, it checks for the IP address in its table. If the IP address is found, it returns the MAC address linked with the IP address in its ARP table. If the IP address is not found in the ARP table, ARP broadcast a packet to every host on the network. The packet contains the IP address for which an MAC address is sought. If a receiving host identifies the IP address as its own, it responds by sending its MAC address back to the requesting host. The MAC address and associated IP address in the response is then cached in the ARP table.

ARP table lookup time is important for certain applications to be able to connect as fast as possible. If an IP address is not present in the ARP table, the ARP software has to request for the MAC address over the network. This will cost time and thus performance in setting up a connection.

For example, a large private network within one Virtual Local Area Network (VLAN) has 10000 hosts inside the network. Some of the hosts share the same network interface hardware forming the physical layer and thus have the same MAC address. Furthermore, all hosts in the network could communicate all other hosts in the network. However, before a connection can be established between hosts, the MAC addresses has to be known. A host obtains its IP address from a network manager service on request. Consequently, each host needs to maintain its own ARP table. The ARP table will have 10000-1 entries linking the IP address to the MAC address. Such a table could be built dynamically in the way described above. However, this will result in a lot of ARP requests over network the obtain the MAC address of corresponding hosts. Furthermore, it will take some time to search through the ARP table to retrieve if already present in the ARP table the MAC address corresponding to a IP address or the detect that the IP-MAC pair is not present in the ARP table. If an application has a requirement on the number of connections per second, this would be hard to fulfil.

At start-up of the network, the ARP tables of the hosts could be populated prior to any exchange of data with other hosts. In this initial phase, when the ARP table is populated, there will be a broadcast storm. This means that with a network comprising N hosts there will be N*(N−1) ARP-requests that would sent out to the network. Theoretically, assuming that the size of an ARP-packet is 28 bytes, there could be a burst of about 2*28*10000*10000 bytes over the network to populate the ARP tables for all hosts in the network.

Given the facts above a straightforward implementation of ARP caching is not an option for large private networks.

Furthermore, in some pseudo wire cases (like ATM over IP, or TDM over IP), emulated protocol requires delivery of the first data sent over the newly established connection. In such cases, there is need that the ARP table is fully populated before any data exchange takes place between host over the network. A fully populated ARP-table allows to set-up a connection between hosts without losing the first IP-packet.

SUMMARY

It is an object of the invention to provide an improved, method of and device of handling protocol addresses, i.e. IP-addresses, and to obviate at least one of the disadvantageous, described above.

According to a first aspect of the invention, there is provided a method of handling a protocol address in a network. The network comprises a number of K servers. A server is a network entity or node for housing a maximum number of L processing units. Each server is uniquely identified in the network by a server identifier. Each processing unit comprises at least one hardware address to connect to the network. A unit identifier assigned to a processing unit uniquely identifies the unit in the server. A processing unit is configured to host a maximum number of M hosts. Each host on a unit comprises a local host identifier which uniquely identifies the host on the processing unit. A processing unit generates a protocol address for a host on the unit based on the local host identifier of the host, the unit identifier of the unit and the server identifier associated with the processing unit, i.e. the server identifier of the network entity housing the processing unit. Subsequently, the unit assigns the protocol address to the host.

The method is based on the concept that the protocol addresses are not given more or less randomly to hosts in the network but in a structured way. A rule is applied to generate the protocol address of a host. By using a rule it is possible to assign protocol addresses to hosts running on the same unit which have some similarity or are in the same range. Some similarity means that only some bits, for example least significant bits (LSB), of the protocol address differ. Furthermore, when the rule defines a unique relationship between protocol address at one side and server identifier, unit identifier and host identifier at the other side, it is possible to derive from a protocol address in an IP message, the server and unit of the host associated with the protocol address. As all hosts on the same unit have the same hardware address or MAC address, only one ARP request have to be sent by a first unit to a second unit to obtain the MAC address of the second unit and a process running on the first unit could generate the protocol address-hardware address pair for all other hosts on the second unit by using the rule. This enables reducing the amount of ARP requests over the network to populate the ARP table at start-up of the network.

In an embodiment of the method, the protocol address comprises a network part and a host identifier part. The server identifier associated with a host is represented by a first parameter having k-bits, wherein k is a positive integer for which holds that $2^k \geq K$. The unit identifier associated with a host is represented by a second parameter having l-bits, wherein l is a positive integer for which holds that $2^l \geq L$. The local host identifier is represented by a third parameter having m-bits, wherein m is a positive integer for which holds that $2^m \geq M$. The host identifier part is obtained by concatenation of the bits of the first parameter, second parameter and the third parameter. These features provide a simple implementation of a rule.

In a further embodiment, the host identifier part comprises H-bits and $k+l+m \leq H$. These features ensure that for each host a unique protocol address could be generated.

In an embodiment, a server defines a segment of the network and the first parameter corresponds to the bits of the host identifier part of the protocol address defining the segment in the network. These features allow to use a router or switching unit in the node or server to connect the server to the network. All the processing units coupled to the switching unit in the server will be in the same sub-net. Consequently all hosts in the server will be in the same sub-net. In this embodiment the sub-net bits correspond to the server identifier.

In an embodiment of the method, a first unit generates a protocol address for a first host with a predefined local host identifier on a second unit. The protocol address is based on the predefined local host identifier of the first host, the unit identifier of the second unit and the server identifier associated with the second unit and first host. Furthermore, the first unit sends a request to the first host with the protocol address to send the hardware address of the second unit which hosts the first host. The second unit sends a response comprising the hardware address of the second unit in response to the request. Subsequently, the first unit retrieves the hardware address of the second unit from the response and stores the relation between the protocol address of the first host and the hardware address of the second unit in a database of the first unit. The database corresponds to the ARP table which defines the relationship between an IP address and the MAC address. As one or more hosts could by hosted by one processing unit or board and a processing unit comprises one interface to the network and thus one MAC address, the rule to generate a protocol address also provides a way to address each processing unit in the network only one time by generating a protocol address for a host with a particular host identification hosted by a processing unit in a server of the network.

In a further embodiment, at least one most significant bit of the first parameter defines the number of bits of the first, second and third parameter. This feature allows to use at least two rules to generate protocol addresses. This could be advantageous in large private network if there is need to use at least two different types of processing units in the network. For example, an old type capable of hosting up to 4 hosts and a new type capable of hosting up to 64 hosts. This feature enables to replace partially servers housing old processing units with servers housing new processing units. Only, the algorithm to generate the protocol address has to be replace to allow the old processing units to generate protocol addresses in accordance to the two or more rules.

In an embodiment, the storing step comprises generating an index address with a predefined length by concatenation of at least the bits of the first parameter and the bits of the second parameter. Subsequently the hardware address of the second unit is linked to the index address in the database. These features allows reducing the number of entries in the ARP table when all possible IP address en MAC address combinations have to retrieved from the ARP table. A reduced ARP table has the advantageous that it requires a less complex memory to store the table. In an alternative embodiment, the index address is obtained by concatenation of the network part, the bits of the first parameter, the bits of the second parameter and optionally at least one padding bit.

In a further embodiment, for all other hosts on the second unit the first unit generates a protocol address for another host on the second unit. The protocol address is based on the local host identifier of the another host, the unit identifier of the second unit and the server identifier associated with the second unit and the another host. The first unit stores the relation between the protocol address of the another host hosted by the second unit and the hardware address of the second unit retrieved in the previous retrieving step. These features allows to fully populate an ARP table with a reduced number of ARP requests.

In an embodiment of the method, a process of the first unit receives a request from a host on the first unit to provide the hardware address associated with a protocol address. The process of the first unit processes the protocol address to obtain an index address. The process of the first unit retrieves from the database the hardware address associated with the protocol address with use of the index address. Finally, the process of the first unit sends the retrieved hardware address to the host on the first unit. These features enable to use a reduced ARP table to obtain the MAC address of any hosts from the reduced ARP table.

In a further embodiment, the process deduces the number of bits of the first, second and third parameter in dependence of at least one bit of the protocol address, retrieves the first and second parameter from the protocol address, and generates the index address having a predefined length by concatenation of at least the bits of the first parameter and the bits of the second parameter. In a further embodiment, the index address is obtained by concatenation of the network part of the protocol address, the bits of the first parameter and the bits of the second parameter and optionally at least one padding bit. These features enable to use in one private network two or more types of servers each housing a different type of processing units. By using at least one bit of the protocol address to identify to type of processing units in a server, it is possible to apply two or more rules to retrieve the index address from the protocol address.

In a further embodiment of the method, when the hardware address could not be retrieved from the database, the process of the first unit sends to a remote host having the protocol address a request to send its hardware address. The remote host having the protocol address sends a response comprising the hardware address of the host in response to the request. The process of the first unit retrieves the hardware address from the response and stores the relation between the protocol address of the remote host and the hardware address of the second unit hosting the remote host in a database (204) of the first unit.

According to a second aspect, there is provided a processing device comprising a processor, an Input/Output device to connect to the network system, a database and a data storage comprising instructions, which when executed by the processor, cause the processing device to generate a protocol address for a host on the processing device based on a local host identifier of the host, the unit identifier of the processing device and the server identifier associated with the processing device; and to assign the protocol address to the host.

In a further embodiment, the instructions, which when executed by the processing device cause the processing device to generate a protocol address for a first host with a predefined local host identifier on a second unit based on a predefined local host identifier of the first host, a unit identifier of the second unit and a server identifier associated with the second unit, to send a request to the first host with the predefined local host identifier to send a response comprising its hardware address, to retrieve the hardware address from the response from the second unit; and to store the relation between the protocol address of the first host and the hardware address of the second unit in a database of the processing device.

In an alternative embodiment, the instructions, which when executed by the processing device cause the processing device to receive a request from a local host to provide the hardware address associated with a protocol address, to process the protocol address to obtain an index address; to retrieve from the database the hardware address with use of the index address, and to send the retrieved hardware address to the local host.

Other features and advantages will become apparent from the following detailed description, taken in conjunction with the accompanying drawings which illustrate, by way of example, various features of embodiments.

BRIEF DESCRIPTION OF THE DRAWINGS

These and other aspects, properties and advantages will be explained hereinafter based on the following description with reference to the drawings, wherein like reference numerals denote like or comparable parts, and in which.

DETAILED DESCRIPTION

Figure 1:
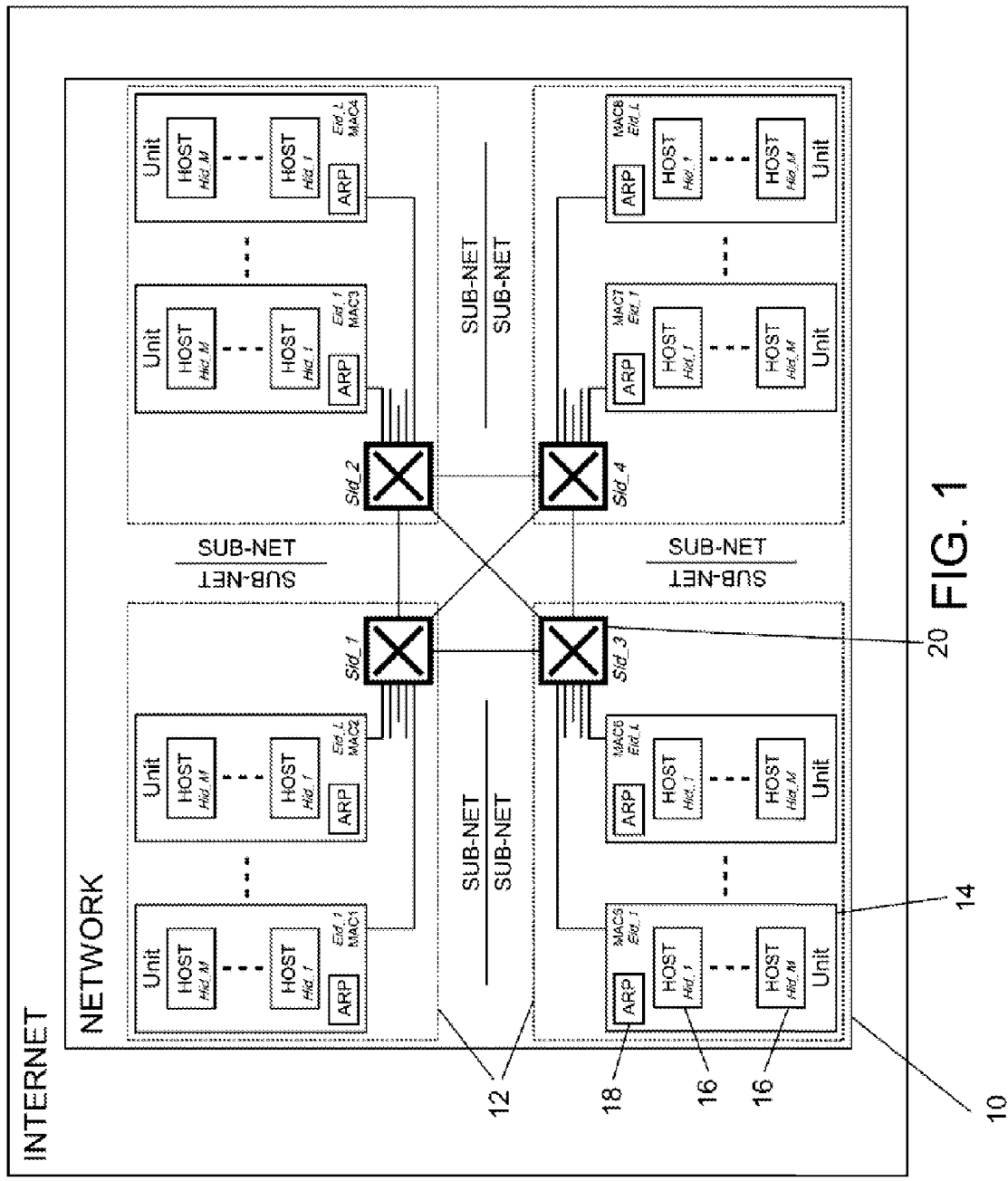
FIG. 1 is a block diagram showing schematically a network architecture with hosts running on units.

FIG. 1 shows schematically a network architecture suitable for applying the invention. A network 10 is shown in the internet. The network could also be a separated and concealed network. The network could belong to one operator or to a group of operators jointly owned. The network has a single network operation and management (O&M) service. The network 10 comprises four nodes. In the remainder of the description node will be referred to as a server 12. A server is a network entity for housing a number of 0-N switching/routing units and a number of 0-N processing units. In FIG. 1, a server 12 comprises one switching unit 20 and L processing units 14. A switching unit 20 is a computer networking device inside a server that links network segments or network devices. A switching/routing unit receives a message from any device connected to it and then transmits the message only to the device for which the message was meant. A switching unit 20 connects a processing unit 14 in a server 12 to the other processing units 14 in the server and to other servers 12. The switching units 20 are used to divide the network in sub-networks. This means that messages between hosts on the same server will not be transmitted to any of the other servers in the network.

A processing unit 14 is a piece of equipment inside a server of the network. It is characterized that it has one physical Ethernet connection and one media access control (MAC1, . . . MAC8) address. The MAC address is the hardware address of the connection. The processing unit 14 could be in the form of a processing board in the server. The processing unit is suitable to host a number of 1-M hosts 16. Each host 16 has at least one internet protocol (IP) address. Thus the processing unit 14 has at least 1-M IP addresses. Applications run on the processing unit and are hosted by one of the hosts 16. An application may request a connection to a certain destination having a IP address for which an IP/MAC address pair has to be resolved before the connection is set-up. To obtain the MAC address associated with a particular IP address, a host 16 on a processing unit 14 requests the ARP process 18 running on the processing unit 14 to provide the MAC address. From FIG. 1 is clear that all hosts 16 (Hid_1, . . . , Hid_M) on a processing unit 14 share the same MAC address.

Each server 12 in the network is uniquely identified by a server identifier (Sid_1, . . . , Sid_4). Each processing unit 14 in a server 12 is uniquely identified by a unit identifier or equipment identifier (Eid_1, . . . , Eid_L). Furthermore, each host 16 on a processing unit 14 is uniquely identified by a local host identifier (Hid_1, . . . , Hid_M). Depending on the implementation, the server identifier could also be the sub-network identity which marks one segment of the same virtual local area network (VLAN). In this case Sid_x marks the Ethernet switch board identity of a switching unit 20 having number x, Eid_x marks uniquely an equipment board with Ethernet connectivity within one VLAN segment having number x and Hid_x marks uniquely IP host with number x within an equipment board.

Figure 2:
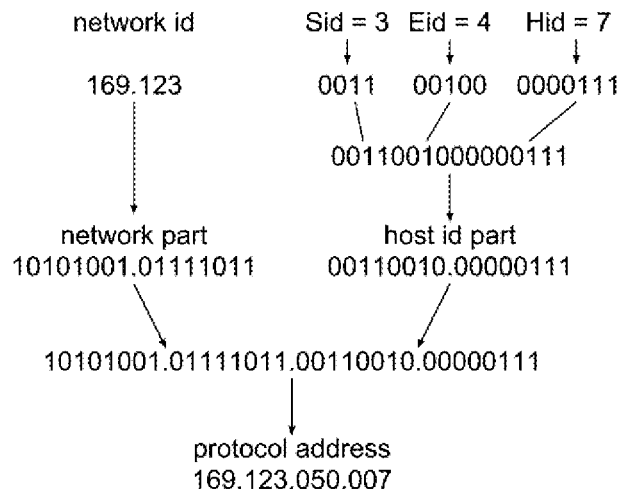
FIG. 2 shows schematically a rule to generate a protocol address.

In the network of FIG. 1, all hosts in will receive a protocol address which is based on the local host identifier Hid_x of the host, the unit identifier Eid_x of the unit hosting the host and the server identifier Sid_x of the server unit housing the processing unit hosting the host Hid_x. FIG. 2 shows an exemplary embodiment on generating the protocol address in case the internet protocol is IPv4. IPv4 uses 32-bit addresses. The 32-bits could be represented by four bytes. The protocol address comprises a network part of 16 bits and a host id part of 16 bits. The network part is a fixed part identifying the network. This part is identical for all hosts in the network. The host id part could be used to uniquely identify hosts in the network. This means that $2^{16}=65536$ protocol addresses are available to be assigned to hosts.

In the network of FIG. 1, a hosts could be identified uniquely by three parameters: a first parameter Sid associated with the server identifier (Sid_x), a second parameter Eid associated with the unit identifier (Eid_x) and a third parameter Hid associated with the host identifier (Hid_x). These three parameters will be used in a rule or algorithm to generate the host id part of the protocol address.

In general, if the network comprises K servers, the value of the first parameter Sid could be represented by k-bits, k being a positive integer for which holds that $2^k \geq K$. If the maximum number of processing units in a server of the network is L, the value of the second parameter Eid could be represented by l-bits, l being a positive integer for which holds that $2^l \geq L$. If the maximum number of hosts on a processing unit in the network is M, the value of the third parameter Hid could be represented by m-bits, m being a positive integer for which holds that $2^m \geq M$.

In an embodiment of a rule to generate the protocol address of a host, the host id part is obtained by concatenation of the bits of the first parameter, the second parameter and the third parameter. The same rule should be applied to assign protocol addresses to all hosts running on a processing unit of a server in the network. A unique protocol address could be obtained if the sum of the number of bits to represent the first parameter, the second parameter and the third parameter is smaller or equal than the length of the host identifier part of the protocol address. Thus $k+l+m \geq H$, wherein H is the length in bits of the host identifier part and k, l and m are the number of bits to represent the first, second and third parameter respectively.

FIG. 2 is an example assuming that network could comprise up to 16 servers, a server could contain up to 32 processing units and a processing unit could host up to 128 hosts. In this case the value of the first parameter Sid could be represented by 4 bits, the value of the second parameter Eid could be represented by 5 bits and the value of the third parameter Hid could be represented by 7 bits. In the example of FIG. 2, a host with Hid value 7 on a processing unit with Eid value 4 wherein the processing unit is in a server with Sid value 3, the first parameter Sid will be represented by the following bits 0011, the second parameter Eid will be represented by the bits 00100 and the third parameter Hid will be represented by the bits 0000111. Concatenation of the bits of the three parameters results in the 16-bit sequence: 0011001100000011. This 16-bit form the host identifier part of the protocol address. The host identifier part is subsequently combined with the network part 10101001.01111011 in binary representation and 169.123 in dotted decimal representation. By applying the rule a protocol address for IPv4 169.123.050.007 is obtained. This protocol address is subsequently assigned to the host with Hid=3, Eid=4 and Sid=3.

The assignment of protocol addresses according to a rule as described above has some advantages. As all hosts on a processing unit have the same hardware address, i.e. the same MAC address, only one ARP request has to be broadcast by an ARP process maintaining the ARP table on a processing unit to populate the ARP table for all other hosts on the processing unit hosting the host for which the ARP request was send. By means of the rule, the ARP process could generate to protocol addresses for all other hosts in the same processing unit and storing subsequently the relationship between protocol addresses and hardware address in the ARP table.

Figure 3:
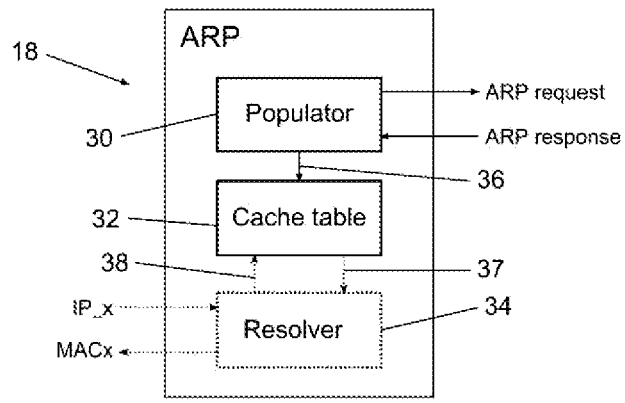
FIG. 3 is a block diagram showing a first embodiment of a process running on a processing unit in a server.

FIG. 3 is a block diagram showing a first embodiment of a process 18 running on a processing unit in a server. This process 18 is configured to perform the address resolution protocol ARP for IPv4 devices. All processing units in the network use the same rule or algorithm to generate protocol addresses. By means of the first embodiment is explained how in initial phase of a processing unit in the network, the ARP table 32 is populated by populating function 30.

The populating function 30 uses three variables Sid, Eid and Hid corresponding the first, second and third parameter described before. In this way, the function 30 could address all hosts in the network. For all possible values of the first variable Sid and second variable Eid, function 30 generates a protocol address for a host with a predefined local host identifier Hid value. The predefined local host identifier has for example a value 1. Based on the values of variables Sid, Eid and Hid=1 the function 30 generates a protocol address. This protocol address belongs to a host on a second processing unit in the network. After generation of the protocol address, the function 30 of the ARP routine 18 running on a processing unit broadcasts an ARP request. The host on the second processing unit having the generated protocol address will recognize that the ARP request and responds back to the processing unit which has send the ARP request an ARP response. The ARP response comprises both the protocol address, i.e. IP address, and the hardware address, i.e. MAC address, associated with the host generating the response. The populating function 30 receives the ARP response and stores the relation between protocol address and hardware address in the ARP table 32.

The ARP table 32 could have the format of a conventional ARP table. In this case, the ARP table comprises for each host in the network an entry specifying the relation between protocol address and hardware address. A conventional ARP routine could than access the ARP table to obtain the hardware address associate with a protocol address. With such an ARP table, the populating function 30 is configured to store after receipt of the ARP response the relation between protocol address and hardware address of all possible hosts running on the same processing unit in the ARP table. For this, the function uses again the rule to generate for all other hosts on the same processing unit the corresponding protocol address and to store the relation between protocol address and hardware address in the ARP table. Thus, given the parameters used in the description with reference to FIG. 2, wherein a processing unit could comprise up to 128 hosts, after receipt of an ARP response and storage of the association between protocol address and hardware address in the ARP response, the populating function generates the protocol addresses for the other 127 possible hosts on the processing unit and stores for each of the 127 protocol addresses the associations between the protocol address and the hardware address retrieved from the ARP response in the ARP table. Connection 36 between the populating function 30 and the ARP table 32 indicates the storage of the association between protocol address and hardware address in the ARP table.

In the way described above before any communication takes place between hosts in the network a fully populated ARP table is generated. If such an ARP table is available, there is no need to broadcast any ARP request before a connection is set-up between two hosts in the network.

FIG. 3 shows further with dotted lines that the ARP routine 18 comprises a resolver function 34. At set-up of a connection with another host, a host which is hosted on the same processing unit as the ARP routine is running, could request the ARP routine to supply the hardware address MACx associated with the protocol address IP_x of the another host. Reference numeral 38 indicates data that is sent to the ARP table 32 and reference numeral 37 indicates the hardware address that is sent back to the resolver function 34 in response to the data 38. In case the ARP table is a fully populated ARP table, which means that all possible protocol addresses have an entry in the ARP table, the data 38 corresponds to the protocol address or at least the host identifier part of the protocol address.

An advantage of applying a rule to generate the protocol address and the knowledge that all hosts on the same processing unit have the hardware address of the processing unit is that the ARP table needs only one entry to enable a resolver function 34 to obtain the hardware address associated with all the hosts on the processing unit. Now an index address is used to address the processing unit hosting a host having a particular protocol address. The index address is derived from the protocol address of a host. Both the populating function 30 and the resolver function 34 will then be able to derive the index address from the protocol address. The rule assures that all protocol addresses of hosts hosted by the same processing unit have the same index address.

Figure 5:
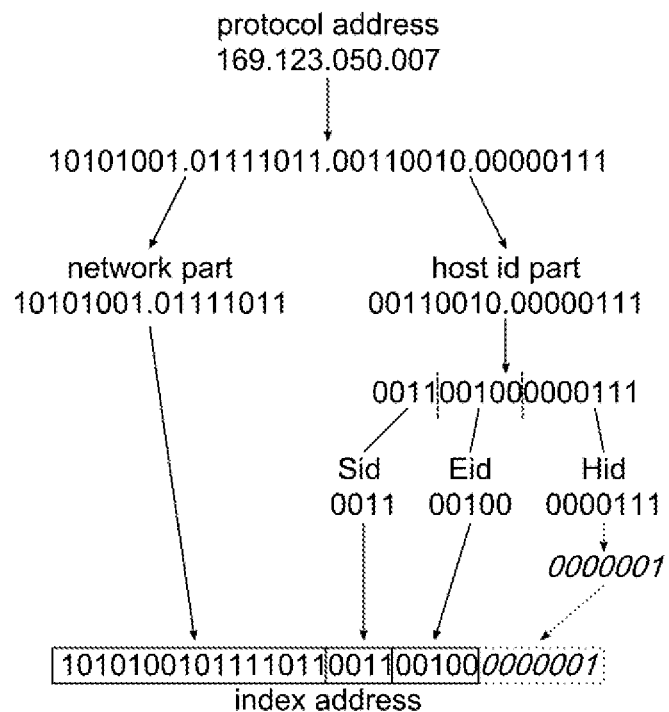
FIG. 5 shows schematically a rule to generate an index address from a protocol address; and, FIG. 6 is a block diagram illustrating a processing unit.

FIG. 5 shows schematically an embodiment of a rule to generate an index address from a protocol address. In this embodiment, the rule is based on the rule to generated the protocol address is described before with reference to FIG. 2. Assume we have IPv4 protocol address 169.123.050.007 in dotted decimal format. The first two numbers 169.123 correspond to the network part of the protocol address and the last two numbers correspond to the host identifier part of the protocol address. Furthermore, it is known according to the applied rule to generate the protocol address that the host identifier part is obtained by concatenation of the bits representing three parameters Sid, Eid and Hid. The value of Sid corresponds to the server identifier of the server housing the processing unit hosting the host having the protocol address, the value of Eid corresponds to the unit identifier of the processing unit hosting the host having the protocol address and Hid is the host identifier which uniquely identifies the host on the processing unit. Furthermore according to the rule, the parameter Sid comprises 4 bits, the parameter Eid comprises 5 bits and the parameter Hid comprises 7 bits. FIG. 5 illustrates how from the value 050.007 in dotted decimal format the values of the three parameters Sid, Eid and Hid are derived. Subsequently, the values of the parameter Sid and Eid are used to obtain the index address. In FIG. 5, the index address is obtained by concatenation of the network part of the protocol address, the parameter Sid and the parameter Eid. Optionally, at least one padding bit is used to extend the index address to a bit length which is suitable to address the memory of the processing unit in which the ARP table is stored. FIG. 5 shows an embodiment wherein the bit values of parameter Hid are replaced by default values. In this way the value 0000111 of parameter Hid is replaced by a value 0000001.

FIG. 5 shows two embodiments two obtain the index address. In the first embodiment, the bits of the protocol address corresponding to parameter Hid are removed from the protocol address to obtain the index address. In the second embodiment, the bits of the protocol address corresponding to the parameter Hid are replace by default bit values to obtain the index address. In the given example wherein a processing unit could host 128 hosts, the method described above allows reducing the number of entries of the ARP table with a factor 128. These two embodiments reduces the memory needed to store the ARP table and the time to obtain the hardware address from the ARP table.

Figure 4:
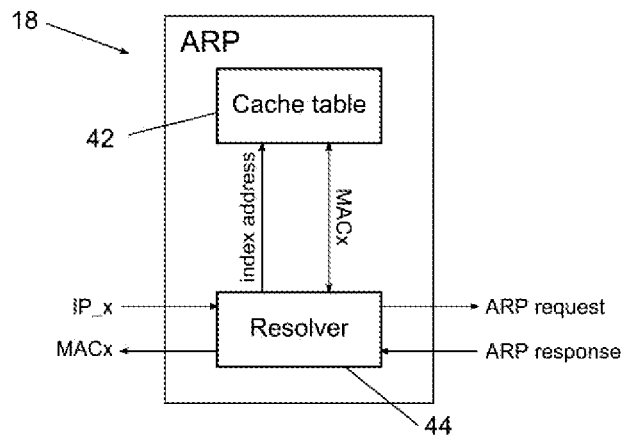
FIG. 4 is a block diagram showing a second embodiment of a process running on a processing unit in a server.

FIG. 4 shows an embodiment of an ARP routine which makes use of the advantages of a reduced ARP table. In this embodiment, the ARP routine does not have the populating function as shown in FIG. 3. Now, at start-up of the processing unit the ARP table 42, is empty. When a local host would like to setup a connection with another host in the network, the host request the ARP routine to provide the hardware address of the another host by submitting the protocol address IP_x to the resolver function 44 of the ARP routine 18. The resolver function 44 derives the index address from the protocol address as described above and uses the index address to retrieve the hardware address MACx from the ARP table 42. If an entry corresponding to the index address is present in the ARP table 42, the resolver function reads the MACx from the ARP table 42 and responds to the local host by supplying the MACx to the host.

If an entry corresponding to the index address is not present in the ARP table, the resolver function 44 will broadcast an ARP request. In response to the ARP request, the host having the protocol address in the ARP request will respond by submitting an ARP response to the resolver function 44 sending the ARP request. The ARP response comprises both the protocol address and hardware address of the host sending the ARP response. After receipt of the ARP response, the resolver function retrieves the protocol address and hardware address from the response, derives the index address from the protocol address. Subsequently the resolver function 44 stores the hardware address at a location having the index address. Furthermore, in response to the ARP response the resolver function 44 supplies the hardware address in the ARP response to the local host requesting to resolve the hardware address associated with protocol address IP_x.

The embodiment of FIG. 4 reduces the ARP table size and the amount of ARP request over the network by a factor which is defined by the number of hosts on a processing unit in the network.

Figure 6:
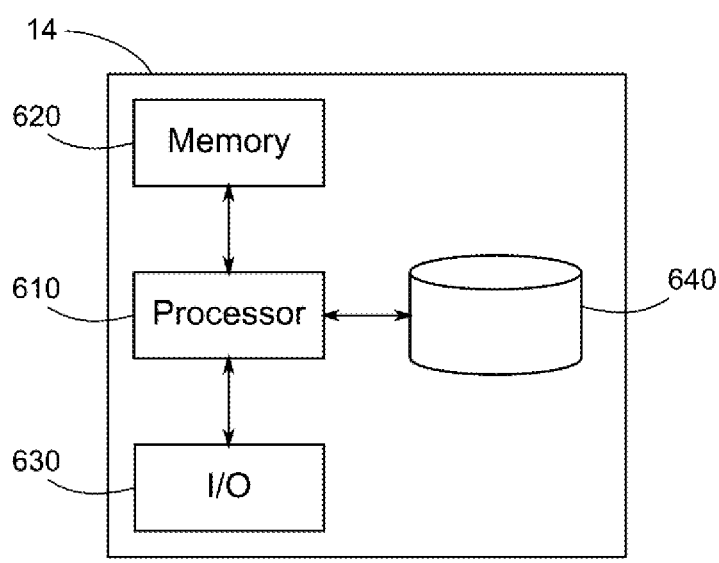

Referring to FIG. 6, there is illustrated a block diagram of exemplary components of a processing unit 14 shown if FIG. 1. The processing unit 14 can be any piece of equipment inside a node or server of a network on which the functionality described above is implemented. The processing unit could be a switching/router unit or processor board. As illustrated in FIG. 6, the processing unit 14 comprises a processor 610, a data storage 620, an Input/Output unit 630 and an database 640. The data storage 620, which could be any suitable memory to store data, comprises instructions that, when executed by the processor 610 cause the unit 14 to perform the actions described before. The I/O unit 630 is configured to provide an Ethernet connection and comprises one hardware address in the form of a MAC address. The I/O unit allows hosts hosted on the processing unit to communicated with other hosts on other processing units in the network. The database 640 is configured to store the relationship between a protocol address of a host hosted by a piece of hardware comprising a hardware address and the hardware address of said piece of hardware. The database 640 provides a functionality which is comparable with the ARP table in current Ethernet devices.

It might be possible that the network comprises servers of a first type which houses up to 32 processing units, which units are capable of hosting 16 hosts and servers of a second type which houses up to 8 processing units, which unit are capable of hosting 256 hosts. A network comprising only the first type of servers would need up to 128 servers to provide a network with $2^{16}$ hosts. A network comprising only the second type of servers would need up to 32 servers to provide a network with $2^{16}$ hosts. When applying a simple rule as described above, which could be used for both type of servers, the number of servers would be limited to 8 servers. Eight bits would be needed for parameter Hid, as a processing unit in the network could host up to 256 host. Five bits are needed for parameter Eid, as a server could host up to 32 processing units. Given that the Host identifier part of the protocol address comprises 16 bits, the number of bits available for parameter Sid is limited to 16−8−5=3 bit, which corresponds to 8 servers. Such a simple rule would limit the maximum number of hosts in the network significantly and would hinder a provider of the network to replace gradually old servers of the first type by new servers of the second type.

To overcome this problem a second embodiment of a more complex rule is described below. In this rule, the value of the server identifier Sid_x and the bit value of the most significant bit (MSB) of the host identifier part of the protocol address determines the type of server and consequently the rule that should be applied for said type of server. In the exemplary embodiment a most significant bit with a value '1' indicates a server of the first type and a most significant bit with a value '0' indicate a server of the second type. This means that, for the servers of the first type a rule could be applied which uses five bits for parameter Eid to address up to 32 processing units in the first type of servers and which uses 4 bits to address up to 16 hosts hosted by one processing unit in the server of the first type. As a result of this 16−5−4=7 bits are available for the parameter Sid. However, the MSB has a predefined value '1', which means that 6 bits could be used to address uniquely a server of the first type in the network. This means that the network could comprise up to 64 servers of the first type in the network. The 64 servers could host in total 64*32*16=32768 hosts.

Similarly, for the servers of the second type a rule could be applied which uses three bits for parameter Eid to address up to 8 processing units in the second type of servers and which uses 8 bits to address up to 256 hosts hosted by one processing unit in the server of the second type. As a result of this 16−3−8=5 bits are available for the parameter Sid. However, the MSB has a predefined value '0', which means that 4 bits could be used to address uniquely a server of the second type in the network. This means that the network could comprise up to 16 servers of the second type in the network. The 16 servers could host in total 16*8*256=32768 hosts.

To apply the more complex rule in the resolver function, the resolver function as described above has to be adapted to check first the MSB of the host identifier part of the protocol address. Based on the value of the MSB the resolver function knows the number of bits of the parameters Sid, Eid and Hid that have been used to generate the protocol address. This knowledge enables the resolver function to generate the correct index address. In case the index address has the length of the protocol address or the host identifier part of the protocol address, the resolver has to replace the bits representing the host identifier of a host in the host identifier part by a predefined value or sequence of bits corresponding to the applied rule. However if the bit-length of index address is shorter than the bit-length of the protocol address or the host identifier part of the protocol address, the resolver function has to be configured to generate an index address for both types of servers with an equal bit-length. The total number of bits of the parameters Sid and Eid for the servers of the first type in the protocol address is 7+5=12 bits. The total number of bits of the parameters Sid and Eid for the servers of the second type in the protocol address is 5+3=8 bits. Consequently, four predefined padding bits have to be added after the sequence of bits obtained by concatenation of the parameters Sid and Eid to obtain a unique index address with a length of 12 bits for all processing units in the network.

To apply the more complex rule in the populating function, the populating function has the know that the server identification values 0-15 are used to address the 16 servers of the second type and the server identification values 65-127 are used to address the 64 servers of the first type. Furthermore, when the populating function generates a reduced ARP table with only one entry in the table for each processing unit, the populating function has to be adapted to generate index address with a fixed length for both type of servers. This could be done in the way described in the previous paragraph.

This more complex rule allows an operator of the network to replace gradually servers of the first type by servers of the servers of the second type with the ability to provide a network with a large amount of hosts. Furthermore, the more complex rule allows to reduce the size of the ARP table defining all relationships between protocol addresses and hardware addresses of the hosts in the network and the amount of ARP requests needed to populate the ARP table.

In the exemplary embodiment described above, the host identifier part is obtained by concatenation of the bits of first parameter Sid, the bits of second parameter Eid and finally the bits of third parameter Hid. It is also possible to concatenate the bits of the three parameters in another order. In that case, the MSBs of the host identifier part of the hosts in a server differ and the server does not form a kind of subnet wherein all hosts of the server have an protocol address in the same subnet.

It should be noted that the exemplary embodiments are described in relation to Address Resolution Protocol required in the Internet Protocol Version 4 (IPv4). It might be clear that the embodiments could easily be adapted to be suitable for the Neighbor Discovery Protocol (NDP) for IPv6.

The present invention and its exemplary embodiment can be realized in many ways. For example, one embodiment includes a computer-readable medium or a computer program product having computer readable code stored thereon that are executable by a processor of apiece of equipment inside a node of a private network, such as a processor board, to perform the method of the exemplary embodiments as previously described.

The invention provides a mechanism which reduces the search time through the ARP table. As the ARP table could be fully populated prior to any communication between hosts in the network, the ARP table could be implemented as a lookup table in a memory. By just one read operation the MAC address corresponding to an IP address could be retrieved from the ARP table. This is very useful when a requirement on high connection setup rate is present.

In addition, there is provided a method to populate the ARP table for an internal or private VLAN before any socket connection is requested. Later, when an application connects to a socket and starts sending data, no IP packets will be dropped due to the absence of the link between an IP address and corresponding MAC address in the ARP table, which ARP table could be a reduced ARP table.

Furthermore, there is provided a method which minimizes the ARP table size and the number of ARP requests sent to the network. Consequently, less memory is needed for the ARP table and a potential ARP broadcast storm is avoided on the network.

While the invention has been described in terms of several embodiments, it is contemplated that alternatives, modifications, permutations and equivalents thereof will become apparent to those skilled in the art upon reading the specification and upon study of the drawings. The invention is not limited to the illustrated embodiments. Changes can be made without departing from the idea of the invention.

The invention claimed is:

1. A method of handling one or more protocol addresses in a network; wherein the network comprises a number of servers K, each server being uniquely identified in the network by a server identifier and comprising a maximum number of a plurality of processing units L; wherein each of the plurality of processing units comprises: a) one hardware address to connect to the network, b) a unit identifier that uniquely identifies the processing unit in the server, and c) a maximum number of hosts M, each host comprising a local host identifier uniquely identifying the host on the processing unit; wherein the method comprises:

generating, by a processing unit of the plurality of processing units, a protocol address for a host on the processing unit based on:
the local host identifier of the host;
the unit identifier of the processing unit; and
the server identifier associated with the processing unit;
configuring the processing unit to transmit outgoing messages and receive incoming messages for the host over the network using the protocol address;
transmitting the outgoing messages and receiving the incoming messages for the host over the network using the protocol address.

2. The method of claim 1:
wherein the protocol address comprises a network part and a host identifier part;
wherein the server identifier is represented by a first parameter having k-bits, k being a positive integer such that $2^k \geq K$;
wherein the unit identifier is represented by a second parameter having l-bits, l being a positive integer such that $2^l \geq L$;
wherein the local host identifier is represented by a third parameter having m-bits, m being a positive integer such that $2^m \geq M$;
further comprising obtaining the host identifier part by concatenating the bits of:
the first parameter;
the second parameter; and
the third parameter.

3. The method of claim 2, wherein the host identifier part comprises H-bits and $k+l+m \geq H$.

4. The method of claim 2:
wherein a server defines a segment of the network;
wherein the first parameter corresponds to the bits of the host identifier part of the protocol address defining the segment in the network.

5. The method of claim 2, wherein a first host is located on a second processing unit of the plurality of processing units and has a further protocol address and a predefined local host identifier, the method further comprising:
generating the further protocol address of the first host based on:
the predefined local host identifier of the first host;
the unit identifier of the second processing unit; and
the server identifier associated with the second processing unit;
sending a request for the hardware address of the first host having the further protocol address;
receiving, from the second processing unit in response to the request, a response comprising the hardware address of the second processing unit;
retrieving the hardware address of the second unit from the response;
storing a relation between the further protocol address of the first host and the hardware address of the second processing unit in a database.

6. The method of claim 5, wherein at least one most significant bit of the first parameter defines the number of bits of the first parameter, second parameter, and third parameter.

7. The method of claim 5, wherein storing comprises:
generating an index address with a predefined length by concatenating at least the bits of the first parameter and the bits of the second parameter;
linking the hardware address of the second processing unit to the index address.

8. The method of claim 5, further comprising:
generating an additional protocol address for each respective additional host on the second processing unit based on:
the local host identifier of each respective additional host;
the unit identifier of the second processing unit; and
the server identifier associated with the second processing unit;
storing a relation between each additional protocol address of each respective additional host and the hardware address of the second processing unit.

9. The method of claim 2, further comprising the processing unit:
receiving a request from the host to provide the hardware address associated with a further protocol address;
processing the further protocol address to obtain an index address;
retrieving the hardware address from a database by using the index address; and
sending, in response to successfully retrieving the hardware address, the retrieved hardware address to the host on the processing unit.

10. The method of claim 9, wherein processing comprises:
deducing the number of bits of the first parameter, second parameter, and third parameter, based on at least one bit of the further protocol address;
retrieving the first parameter and second parameter from the further protocol address;
generating the index address having a predefined length by concatenating at least the bits of the first parameter and the bits of the second parameter.

11. The method of claim 9, further comprising, in response to unsuccessfully retrieving the hardware address, the processing unit:
sending a request for the hardware address to a remote host having the further protocol address;
receiving, in response to the request, a response comprising the hardware address;
retrieving the hardware address from the response;
storing, in a database of the processing unit, a relation between the further protocol address of the remote host and the hardware address of a second processing unit of the plurality of processing units hosting the remote host.

12. A processing device, comprising:
an Input/Output device configured to connect to:
a network system;
a database; and
a data storage comprising instructions;
a physical processor that, by executing the instructions, is configured to:
generate a protocol address for a host on the processing device based on:
a local host identifier of the host;
a unit identifier of the processing device; and a server identifier associated with the processing device;

configure the processing device to transmit outgoing messages and receive incoming messages for the host over the network using the protocol address;

transmit the outgoing messages and receive the incoming messages for the host over the network using the protocol address via the Input/Output device.

13. The processing device of claim 12, wherein the physical processor, by executing the instructions, is further configured to:

generate a further protocol address for a first host having a predefined local host identifier and located on a second processing unit based on:
  the predefined local host identifier of the first host;
  a unit identifier of the second processing unit;
  a server identifier associated with the second processing unit;

send a request for a response comprising a hardware address to the first host having the further protocol address;

retrieve the hardware address of the second processing unit from the response; and store a relation between the further protocol address of the first host and the hardware address of the second processing unit in the database.

14. The processing device of claim 12, wherein the physical processor, by executing the instructions, is further configured to:

receive, from a local host, a request to provide the hardware address associated with a further protocol address;

process the further protocol address to obtain an index address;

retrieve, from the database, the hardware address by using the index address; and send, to the local host, the retrieved hardware address.

15. The processing device of claim 13, wherein the physical processor, by executing the instructions, is further configured to:

generate an additional protocol address for each respective additional host on the second processing unit based on:
  a respective local host identifier of each additional host;
  the unit identifier of the second processing unit; and
  the server identifier associated with the second processing unit;

store in the database, for each additional protocol address, an additional relation between the additional protocol address and the hardware address of the second processing unit.

16. The processing device of claim 13:

wherein the protocol address comprises a network part and a host identifier part;

wherein the server identifier, unit identifier, and predefined local host are each represented by respective parameters, each parameter comprising bits;

wherein to generate the protocol address, the physical processor is configured to obtain the host identifier part by concatenating the bits of the respective parameters.

17. The processing device of claim 14, wherein to store the physical processor is configured to:

generate the index address with a predefined length by concatenating at least the bits of the parameter representing the server identifier and the bits of the parameter representing the unit identifier;

link the hardware address to the index address.

18. The processing device of claim 14, wherein the physical processor, by executing the instructions, is further configured to:

responsive to unsuccessfully retrieving the hardware address, send a request for the hardware address to a remote host having the further protocol address hosted on a second processing unit;

receive, in response to the request, a response comprising the hardware address;

retrieve the hardware address from the response;

store a relation between the further protocol address of the remote host and the hardware address in the database.

19. A method, implemented by a processing unit, of handling a protocol address in a network, the method comprising:

generating the protocol address for a host on the processing unit based on:
  a local host identifier of the host;
  a unit identifier of the processing unit; and
  a server identifier of a server comprising the processing unit;

configuring the processing unit to transmit outgoing messages and receive incoming messages for the host over the network using the protocol address;

transmitting the outgoing messages and receiving the incoming messages for the host over the network using the protocol address.

* * * * *

UNITED STATES PATENT AND TRADEMARK OFFICE
CERTIFICATE OF CORRECTION

PATENT NO. : 9,450,909 B2  
APPLICATION NO. : 14/131804  
DATED : September 20, 2016  
INVENTOR(S) : Tonzetic et al.

Page 1 of 1

It is certified that error appears in the above-identified patent and that said Letters Patent is hereby corrected as shown below:

In the Specification

In Column 1, Line 65, delete "the obtain" and insert -- to obtain --, therefor.

In Column 2, Line 22, delete "between host" and insert -- between hosts --, therefor.

In Column 4, Line 7, delete "en MAC" and insert -- and MAC --, therefor.

In Column 4, Line 8, delete "to retrieved" and insert -- to be retrieved --, therefor.

In Column 7, Line 14, delete "$k+1+m \geq H$," and insert -- $k+1+m \leq H$, --, therefor.

In Column 9, Line 42, delete "two obtain" and insert -- to obtain --, therefor.

In Column 10, Line 34, delete "an database" and insert -- a database --, therefor.

In Column 10, Lines 41-42, delete "communicated" and insert -- communicate --, therefor.

In Column 12, Line 21, delete "an protocol" and insert -- a protocol --, therefor.

In the Claims

In Column 13, Line 41, in Claim 3, delete "$k+1+m \geq H$." and insert -- $k+1+m \leq H$. --, therefor.

Signed and Sealed this  
Tenth Day of January, 2017

Michelle K. Lee  
*Director of the United States Patent and Trademark Office*